United States Patent [19]
Mezheritsky et al.

[11] Patent Number: 5,823,149
[45] Date of Patent: Oct. 20, 1998

[54] WATER/FUEL MIXING SYSTEM FOR A GASOLINE ENGINE

[75] Inventors: Anatoly D. Mezheritsky, Vancouver, Canada; Edward M. Halimi, Montecito, Calif.

[73] Assignee: Turbodyne Systems, Inc., Carpinteria, Calif.

[21] Appl. No.: 690,313

[22] Filed: Jul. 24, 1996

[51] Int. Cl.⁶ .................................................. F02B 47/02
[52] U.S. Cl. .................................. 123/25 A; 123/25 J
[58] Field of Search .............................. 123/25 R, 25 A, 123/25 C, 25 J, 25 K, 25 L, 25 M, 25 N

[56] References Cited

U.S. PATENT DOCUMENTS

| | | | |
|---|---|---|---|
| 4,122,803 | 10/1978 | Miller | 123/25 C |
| 4,279,223 | 7/1981 | Csonka et al. | 123/25 C |
| 4,351,289 | 9/1982 | Renda | 123/25 K |
| 4,476,817 | 10/1984 | Lindberg | 123/25 J |

*Primary Examiner*—Erick R. Solis
*Attorney, Agent, or Firm*—Brinks Hofer Gilson & Lione

[57] ABSTRACT

NOx emissions from gasoline engines are reduced by mixing water in the gasoline to reduce combustion temperatures. The water is dispersed in the gasoline as the gasoline is delivered to the cylinders. When the engine is not operating, the water separates from the gasoline and causes rusting. In accordance with this invention, the mixing of water into the gasoline is terminated before the engine is shut off so as to purge the system of the water/gasoline dispersion so that there no longer is water in the fuel supply system by the time the engine is stopped.

36 Claims, 2 Drawing Sheets

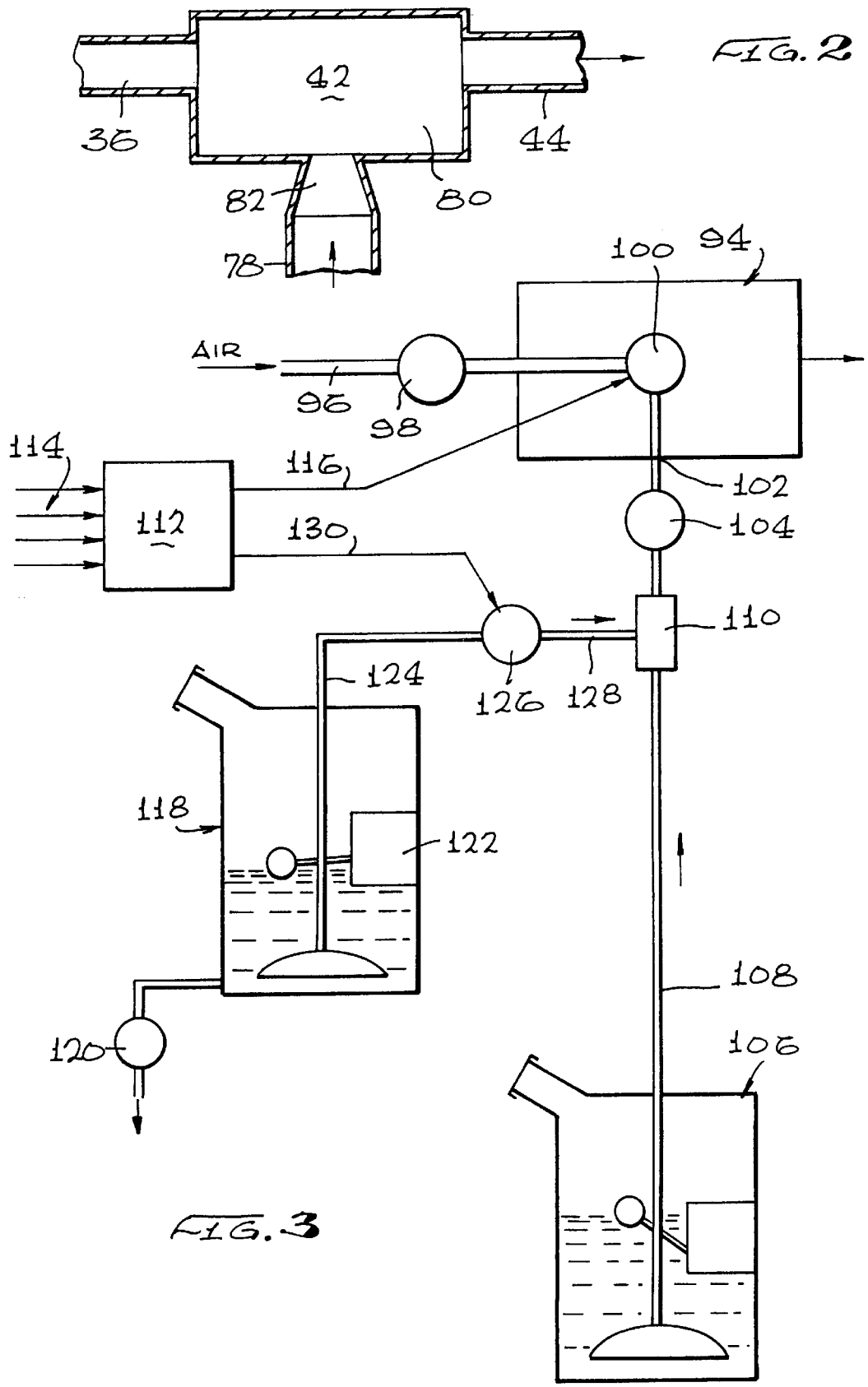

WATER/FUEL MIXING SYSTEM FOR A GASOLINE ENGINE

FIELD OF THE INVENTION

This invention is directed to mixing water into the gasoline supply to a gasoline engine to markedly reduce the content of NOx gases and other air pollutants in exhaust from gasoline engines, but terminating the water introduction before stopping the engine in order to reduce downtime engine corrosion.

BACKGROUND OF THE INVENTION

Air pollution is a major problem in most urban areas. It is a fact that air pollution is the major problem currently facing the automobile industry. The main air pollutants from gasoline engine exhaust gas are carbon monoxide (CO), nitrogen oxides (NOx), carbon dioxide ($CO_2$), hydrocarbons (HC) and particulate matters (PM). The dangers of NOx, CO and hydrocarbons to both the environment and general population are well known. NOx is treated as an ozone precursor. This certainly means more stringent controls for NOx. Yet, each year federal, state and local regulators raise the bar for NOx compliance a little higher. Therefore, NOx remains the main problem to be solved and, to a certain extent, attention must also be paid to carbon monoxide and particulate matter. Where the employment of catalytic converters is currently available, carbon monoxide and hydrocarbon emissions are very small.

NOx remains a problem pollutant. It can be reduced by exhaust gas recirculation (EGR), but such recirculation has a number of disadvantages including major engine wear from sulfuric acid derived from the sulphur inherent in fuels; contamination of the lubricant from soot particles; increased volume of exhaust gas; increased opacity of exhaust gas; and increased specific gasoline consumption. It is seemingly evident that EGR cannot resolve the problem of lowering NOx formation without affecting engine performance and reliability.

Another way of reducing exhaust gas NOx emissions is cooling the combustion by introducing water into the combustion. This has been tested and found to result in decreased NOx production.

The disadvantages of water injection systems as tested in diesel engines using a water/diesel fuel mixture include corrosion of the diesel fuel pumps, diesel fuel injectors and connecting tubing. When water is directly injected into the cylinders, it also results in increased cylinder wear. The provision of separate water injectors in diesel engines increases the cost of an engine and results in more complicated operation, increased maintenance costs, and reduced engine reliability. However, the employment of water in gasoline engine operation does reduce its NOx output and, thus, would be desirable if the disadvantages could be overcome.

The present invention has been developed from a thorough analysis of the nature of exhaust gas emissions formation. The main goals of this invention consist in providing the opportunity to mix into the gasoline a small quantity of water. This water/gasoline mixture forms in a special mixing chamber before the mixture comes to the gasoline injectors or carburetor and then to the cylinders. Only a small water tank, the above-mentioned mixing chamber, a small mixed water/gasoline return tank and control sensors are required in addition to the existing equipment.

SUMMARY OF THE INVENTION

In order to aid in the understanding of this invention, it can be stated in essentially summary form that it is directed to a gasoline engine which includes separate supplies of gasoline and water, with means to mix the water into the gasoline as the gasoline is distributed to the engine, and means to terminate the water supply to the gasoline supply prior to engine shutdown so that, when the engine is shut down, there is no water in the gasoline system which may separate and cause corrosion.

It is, thus, a purpose and advantage of this invention is to provide a gasoline engine system which includes the mixing of water into the gasoline supply, but terminates the water flow before the engine is stopped in order to prevent water problems in the engine when the engine is not operating.

It is a further purpose and advantage of this invention is to provide a water/gasoline mixing system for a gasoline engine which permits the addition of water to gasoline during engine operation, but turns off the water supply prior to engine shutdown so that engine operation after the turning off of the water supply purges the water from the fuel system by combustion so that there is no water in the engine system during shutdown.

It is another purpose and advantage of this invention to provide a water/gasoline mixing system for a gasoline engine which may either have a carburetor or be fuel-injected, together with means for terminating the water before engine shutdown to avoid corrosion in the injection system or carburetor.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 2 is a longitudinal section through the mixer for providing the water/gasoline mixture.

FIG. 3 is a schematic diagram of a carbureted gasoline engine having the water/gasoline mixing and water cutoff system of this invention.

DESCRIPTION OF THE PREFERRED EMBODIMENT

Figure 1:
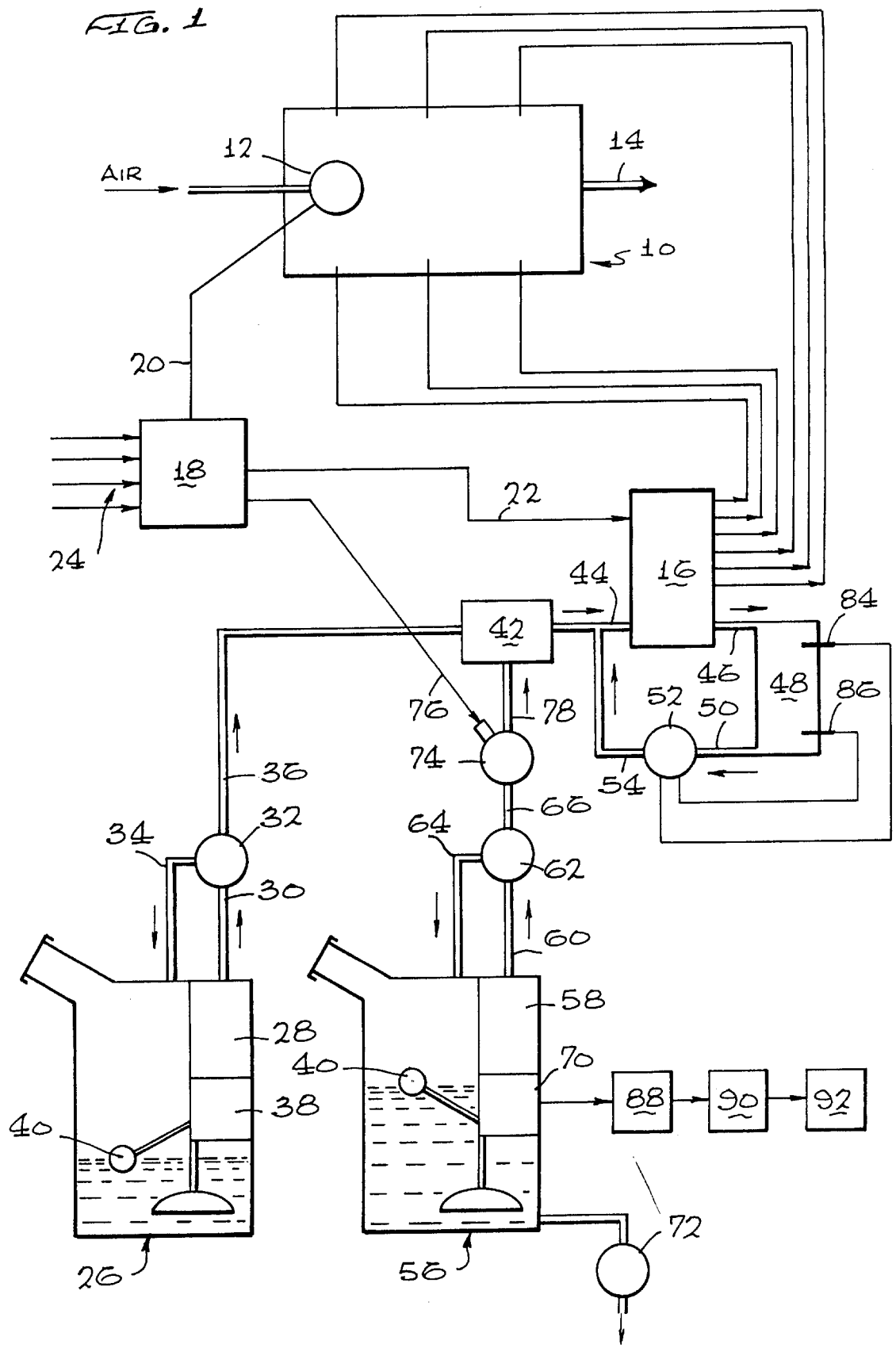
FIG. 1 is a schematic diagram of an injected gasoline engine having the water/gasoline mixing and water cutoff system of this invention.

A six-cylinder gasoline engine is generally indicated at 10 in FIG. 1. It takes in air at air cleaner 12, which is connected by the intake manifold to the intake valve of each cylinder. The manifold may be equipped with a butterfly valve to control the inflow of air. Rotating shaft power is taken out of the engine at shaft 14. The engine 10 is illustrated as being supplied by multiport gasoline injector 16, which has an illustrated fuel injection line connected to a nozzle at the intake valve of each cylinder. The butterfly valve in the intake manifold and the multiport gasoline injector 16 are controlled by engine controller 18 via respective controller lines 20 and 22. The engine controller 18 receives signals on input signal lines, indicated generally at 24, from various relevant sources, including demand, engine speed, engine temperature, and the like. The output from the engine controller 18 manages the gasoline and air to the cylinders to produce the desired speed of shaft 14.

Gasoline tank 26 has an electrically-driven internal gasoline pump 28 therein, which delivers gasoline under pressure into gasoline line 30. In order to limit the gasoline pressure and to provide a known pressure, relief valve 32 in the gasoline line 30 returns excess gasoline via line 34 back to the gasoline tank 26 to maintain the gasoline pressure in gasoline line 36 at a constant value. Fuel gage 38 is controlled by a float 40 in the tank 26 and indicates the amount of gasoline in the tank. The gasoline from line 36 passes through mixer 42 and line 44 to the multiport gasoline injector 16.

Most multiport gasoline injectors have an excess gasoline line which delivers the excess gasoline back to the gasoline tank 26. However, in the preferred embodiment illustrated, the fuel through excess fuel line 46 is captured in an excess water/gasoline mixture storage tank 48 which has a fuel output line 50 connected at the tank bottom to an excess fuel pump 52 for delivering the excess fuel through fuel line 54 back to line 44.

In order to reduce the combustion temperature in the cylinders of engine 10, water is mixed with the gasoline. Water tank 56 contains pump 58, which delivers water under pressure in line 60 to water pressure relief valve 62. The relief valve 62 has a water relief line 64 back to tank 56 so as to maintain the water pressure in water line 66 at a known value. Gage 70 indicates to the operator the amount of water remaining in tank 56. In cold weather, the water in the tank 56 may freeze causing damage to the tank, pump and gage. In order to avoid this, a temperature responsive drain valve 72 is connected to the bottom of water tank 56. The valve 72 opens when freezing temperatures are incurred. This dumps the remaining water in the tank 56 to avoid freezing damage.

In accordance with this invention, shutoff valve 74 is provided in line 66. Shutoff valve 74 preferably is an electrically operated solenoid valve controlled by an electrical signal in signal line 76 from engine controller 18. When valve 74 is open, water passes through line 78 to mixer 42.

FIG. 2 is a longitudinal section through the mixer 42. It is taken on the center line of the inlet line 36, mixture outlet line 44 and water supply line 78. It shows that the mixer 42 has a mixing chamber 80 to which the gasoline inlet line 36 is directly connected. The water inlet line 78, however, has a convergent inlet nozzle 82 at its inlet to the mixing chamber 80. This inlet nozzle 82 turbulently mixes the water with the gasoline so that there is a water/gasoline mixture in the outlet line 44. The valve 74 is positioned closely to nozzle 82 to avoid spillage. The water/gasoline mixture line 44 is as short as possible to minimize the volume thereof. The line 46, pump 52 and the pump connection line 54 to the line 44 is also of minimum length and volume to minimize the amount of water in the system during operation. The mixer is configured so that water is introduced into the gasoline in an amount between 5 and 15 percent by weight, depending on the type of engine. For a particular engine, the water-to-gasoline ratio is fixed and is controlled by the pressure in gasoline line 36, water line 78, and the configuration of mixer 42. In addition, the mixer 42 turbulently distributes water droplets into the gasoline. During normal flow, this mixture passes from the mixer 42 through line 44 to the multiport gasoline injector 16 and, thence, to the engine for combustion.

During normal operation, there is water mixed in the gasoline in line 44. Thus, as referred to above, the excess water/gasoline from the multiport gasoline injector 16 cannot be returned to the gasoline tank 26. Excess water/gasoline storage tank 48 is provided to receive this excess water/gasoline mixture. High level sensor 84 and low level sensor 86 are respectively provided near the top and at the bottom of excess water/gasoline mixture tank 48. These sensors are connected to control pump 52. When the engine 10 is running and when the mixture level in tank 48 is high, the pump 52 returns the mixture to line 44 for use. The pump 52 is shut off when the engine 10 is not running and is shut off when low level sensor 86 detects a nearly empty tank 48.

In normal operation, the valve 74 is open. If the engine was shut down without preparation, there would be a water/gasoline mixture throughout the system from mixer 42 on through multiport gasoline injector 16, through the injector nozzles and into the cylinders. If the engine is not to be operated for some time (for example, 24 hours), the water separates from the gasoline and can cause corrosion. It is to overcome this problem that the valve 74 is provided.

When the engine controller controls the engine so that it is at idle, the engine controller 18 also sends a signal by signal line 76 to close valve 74. Thus, during idling, no water is supplied to the gasoline so that the gasoline purges the system downstream of mixer 42 of water during the idling operation. Instead of using an engine idling signal to close valve 74, other appropriate signals could be used. For example, the motion of the vehicle in which the gasoline engine is installed would be sensed and, when that motion ceased, the valve could be closed. Another signal which would be useful in terminating water flow would be a manual signal from the operator. This is especially useful in association with a stationary engine. The engine controller 18 can be organized so that, when any one or several events occur, such as idling, vehicle motion or the like, the valve 74 could be signaled to be closed. Thus, any one or more of the multiplicity of signals could be used for this purpose.

In normal operation, the engine 10 is running. The pump 28 is supplying gasoline at a known pressure in line 36 through mixer 42 and line 44 to the fuel injector 16. The fuel injector 16 delivers the correct amount of fuel at the correct time to each cylinder. The engine controller 18 controls the timing and the amount of fuel and also controls the amount of air to the intake manifold. In order to reduce combustion temperatures, the pump 58 delivers water at a known pressure to line 66. During normal operation, the valve 74 is open so that this water under pressure flows through line 78 into mixer 42. In mixer 42, it is dispersed into the gasoline to provide a water/gasoline mixture in line 44. In normal operation, the excess water/gasoline mixture passes from fuel injector 16 out through line 46 and back to pump 52, which again delivers it to the inlet of fuel injector 16. As discussed above, the amount of water in the water/gasoline mixture depends on the type of engine and is in the range of 5 to 15 percent water to fuel by weight.

If the engine 10 were shut down from this operating condition, there would be water in the fuel downstream from the mixer 42. In order to avoid this condition, the valve 74 is closed sufficiently before engine shutdown so that the remaining water/gasoline mixture is consumed by engine combustion before the engine is shut down. There is a sufficient time between the closing of valve 74 and the engine shutdown to permit the unmixed gasoline from line 36 to purge the water out of mixer 42 together with the downstream equipment therefrom including the fuel injector 16 and the fuel-injection lines. This avoids corrosion in the system downstream from the mixer while the engine is not operating.

It is recognized that the pollution-reduction benefits of this inventive system are dependent on the availability of water in water tank 56, and further that some users might not refill the water tank 56 when it becomes empty, since obviously the engine 10 will operate on just gasoline. Accordingly, in keeping with this invention and its objectives, a system is provided for shutting off the engine 10 when tank 56 is empty. As seen in FIG. 1, water level gage 70 is connected to a warning light/buzzer 88 for providing a visible/audible signal to the operator when tank 56 is empty. Similarly, a timer 90 is connected to receive an actuating signal at the same time as the light/buzzer 88 so that, after a period of time such as, for example, 5 minutes, the timer 90 actuates an ignition kill circuit 92 for causing engine shutdown.

The water/gasoline mixing system and water cutoff, as disclosed above, can also be used with throttle body gasoline injection or with carburetion.

FIG. 3 shows an internal combustion engine 94 which is a carbureted engine. The engine 94 takes atmospheric air at intake 96 through air cleaner 98 into carburetor 100. Gasoline or a gasoline/water mixture is supplied to the carburetor in fuel line 102. The liquid in fuel line 102 is pressurized by conventional engine-mounted fuel pump 104. The fuel pump 104 takes gasoline by suction from gasoline tank 106 through suction line 108. The suction line 108 is connected to mixer 110, which is identical to mixer 42. The gas tank 106 is equipped with the usual filler spout, suction filter and gas gage.

Control system 112 has a plurality of signal inputs 114 which represent various conditions, such as engine speed, ambient conditions, engine conditions and demand. The control system 112 has an output 116 which conventionally controls the throttle in the carburetor. The throttle controls air through the Venturi throat, and the carburetor delivers an appropriate amount of fuel for that air flow. Fuel pump 104 supplies the necessary gasoline. The suction of fuel pump 104 draws the gasoline from gasoline tank 106 through line 108 and mixer 110. This is conventional operation.

In order to reduce NOx in particular along with other pollutants, combustion is cooled by mixing water with the gasoline. Water tank 118 is provided with a filler spout and suction filter. In addition, the water tank 118 is provided with a temperature-responsive dump valve 120, which opens when the temperature approaches 32° F. to prevent freezing damage to the tank. The water tank 118 has a water level gage 122 therein which signals to the operator the state of the water supply. Since water is supplied at a rate of about 5 to 15 percent of the rate of gasoline supply, the water tank 118 can be much smaller than the gasoline tank 106. In order to assure a sufficient water supply to reduce NOx, the gage 122 may be connected to shut off the engine upon depletion of the water supply, in the same manner as described in connection with the embodiment shown in FIG. 1.

The suction line 124 in the water tank 118 is connected through valve 126 to line 128, which connects to the side port in the mixer. As stated, the mixer 110 is the same as the mixer 42 so that suction of pump 104 draws water into the mixer at the proper ratio to mix with the gasoline to cool combustion, as described.

In order to prevent settling of water from the water/gasoline mixer downstream from mixer 110, the valve 126 is turned off before the engine is shut down. Signal line 130 is connected from engine controller 112 to valve 126 and turns off the valve before engine shutdown. This gives time for the gasoline in line 108 to purge the mixer 110, fuel pump 104, line 102 and carburetor 100 of water/gasoline to provide instead unmixed gasoline. In this way, settling out of water from the mixture in the engine components is avoided. It is only necessary to operate the engine for a short time without the introduction of water for the water to be purged out of the system downstream of the mixer 110.

It should also be noted that the engine 94 can be either naturally aspirated or turbocharged, depending upon other requirements.

This invention has been described in its presently contemplated best modes, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A water/gasoline mixing system for a gasoline engine, comprising:

a gasoline delivery system for delivering gasoline to a gasoline engine;

a gasoline tank for storing gasoline, a pump for withdrawing gasoline from said tank and delivering gasoline through a gasoline line to said engine gasoline delivery system;

a mixer connected to receive gasoline from said gasoline line, said mixer being connected to deliver liquid fuel to said gasoline delivery system;

a water tank for storing water, a water line for delivering water from said water tank through the water line to said mixer, a valve in said water line to said mixer to stop flow of water to said mixer; and an engine controller, said engine controller being connected to said gasoline delivery system for delivering gasoline to the engine in accordance with engine demand, said engine controller also being connected to said water valve to terminate water flow to said mixer prior to engine shutdown so that said gasoline delivery system downstream of said mixer is purged of water by said pump for withdrawing gasoline before engine shutdown.

2. The system of claim 1 wherein said gasoline delivery system is a gasoline injection system.

3. The system of claim 2 wherein said gasoline injection system has an excess gasoline outlet line and there is an excess water/gasoline storage tank connected to receive excess gasoline from said excess gasoline outlet line.

4. The system of claim 3 wherein there is an excess water/gasoline pump connected to receive excess water/gasoline from said excess water/gasoline storage tank and deliver excess water/gasoline mixture back to said mixed water/gasoline line.

5. The system of claim 3 wherein there is sensor means in said excess water/gasoline mixture storage tank to signal the level of water/gasoline mixture in said storage tank.

6. The system of claim 4 wherein there is an excess water/gasoline mixture level sensor in said excess water/gasoline mixture storage tank and said sensor controls said pump to deliver excess water/gasoline mixture back to said mixed water/gasoline line when the engine is running and when said sensor signals the presence of excess water/gasoline mixture in said tank.

7. The system of claim 2 wherein said gasoline injection system is a multiport gasoline injection system.

8. The system of claim 1 wherein said water flow control valve is a solenoid valve electrically operated by an electrical signal from said engine controller and from said level sensor.

9. The system of claim 8 wherein said water flow control valve is closed when said engine controller controls the engine to be idling.

10. The system of claim 1 wherein said mixer mixes water into gasoline at a proportion of 5 to 15 percent water to 95 to 85 percent gasoline by weight.

11. The system of claim 1 wherein said mixer has a mixing chamber and said water line has therein a converging nozzle connected to deliver water at high velocity into said mixing chamber.

12. The system of claim 1 wherein said water tank has a level sensor therein and said level sensor is connected to provide a signal to the engine operator to indicate when the water level in said water tank is low.

13. The system of claim 1 including a warning light/buzzer for the engine operator, and said level sensor is connected to actuate said warning light/buzzer when said water tank becomes empty.

14. The system of claim 13 including a timer and an ignition kill circuit, said level sensor being connected to actuate said timer at the same time said warning light/buzzer is actuated, and said timer being connected to actuate said ignition kill circuit after a given period of time has expired.

15. The system of claim 1 wherein the gasoline engine has a carburetor and said engine controller is connected to control said carburetor to control the amount of fuel/air mixture which is delivered to the engine, said system including an engine-mounted and engine-driven fuel pump, said fuel pump being connected to take suction from said mixer so that, when said engine controller turns off said water valve, said fuel pump draws gasoline from said gasoline tank through said mixer and delivers gasoline to said carburetor to purge water from the fuel pump and said carburetor.

16. The method of operating a gasoline engine having a gasoline tank and a fuel delivery system for delivering fuel to the cylinders of the gasoline engine comprising the steps of:

providing a water tank and means to supply water from said water tank;

providing a water/gasoline mixer between the gasoline tank and the fuel delivery system;

providing a flow of gasoline from the gasoline tank and a flow of water from the water tank;

mixing the flow of water into the flow of gasolines and providing a water/gasoline mixed fuel for delivery to the fuel delivery system for combustion in the engine; and terminating the flow of water to the mixer before the stopping of the engine so that the water/gasoline mixed fuel between the mixer and the engine is purged by a flow of unmixed gasoline before the engine is stopped.

17. The method of claim 16 wherein a valve is provided in the flow path of water to the mixer and the flow of water is terminated by closing the valve.

18. The method of claim 16 wherein the gasoline engine has an engine controller which controls the fuel delivery system to the engine and the controller is also connected to control the water valve so that the terminating step is actuated by the engine controller.

19. The method of claim 16 wherein the engine has an engine-mounted fuel pump and the step of providing a water/gasoline mixed fuel is providing the mixed fuel between the engine-mounted fuel pump and an engine-mounted carburetor so that, when the flow of water is terminated, gasoline purges water from the fuel pump and carburetor.

20. A water/gasoline supply system for a gasoline engine, comprising:

a gasoline tank;

a water tank;

means for delivering a controlled flow of gasoline to the gasoline engine;

a fuel pump and a gasoline conduit between the gasoline tank and the means for delivering a controlled flow of gasoline to the internal combustion engine;

a water-gasoline mixer in the gasoline conduit;

a water conduit and water valve between the gasoline-water mixer and the water tank; and a control for opening the water valve upon operation of the internal combustion engine and for closing the water valve prior to shutdown of the engine, permitting the fuel pump to purge the system of water.

21. The system of claim 20, wherein said means for delivering a controlled flow of gasoline to said engine is a fuel injection system, further comprising an excess water/gasoline collection system for collection of water/gasoline mixture in excess of engine demand.

22. The system of claim 21 wherein said excess water/gasoline collection system comprises a water/gasoline mixture tank.

23. The system of claim 22 wherein said excess water/gasoline collection system further comprises a water/gasoline mixture pump connected to deliver the excess water/gasoline mixture to the fuel injection system.

24. The system of claim 23 wherein the excess water/gasoline mixture tank includes at least one level sensor for operation of the water/gasoline mixture pump.

25. The system of claim 23 wherein the excess water/gasoline mixture tank includes a low-level sensor and a high-level sensor for operation of the water/gasoline mixture pump.

26. The system of claim 20 wherein the fuel pump is located in the gasoline tank.

27. The system of claim 20 wherein the means for delivering a controlled flow of gasoline to the gasoline engine is a carburetor.

28. The system of claim 27 wherein the fuel pump is located between the water-gasoline mixer and the carburetor.

29. The method of claim 16 wherein the fuel delivery system is a fuel injection system, further comprising the step of collecting excess water/gasoline mixture from said fuel injection system in a separate tank.

30. The method of claim 29 further comprising the step of further providing the excess water/gasoline mixture from the separate tank to the fuel injection system.

31. The system of claim 20 wherein water is mixed into the gasoline in the ratio of from 5 to 15 percent by weight.

32. The system of claim 21 wherein said fuel injection system includes a multiport gasoline injector, said multiport gasoline injector receiving a gasoline delivery signal from an engine controller means.

33. The system of claim 20 wherein said water/gasoline mixer comprises a mixing chamber having a gasoline inlet, a water inlet and a mixed water/gasoline outlet.

34. The system of claim 33 wherein said water inlet into said mixing chamber is a convergent nozzle to deliver water into said chamber at a higher velocity than water flow in said inlet upstream from said nozzle.

35. The system of claim 34 wherein water is mixed into the gasoline in the ratio of from 5 to 15 percent by weight.

36. The system of claim 32 wherein there is an excess fuel line wherein excess fuel is delivered from said multiport fuel injector, said excess fuel line being connected to an excess fuel pump, said excess fuel pump delivering liquid in said excess fuel line back to said multiport fuel injector.

* * * * *